US010129760B2

United States Patent
Baroudi

(10) Patent No.: US 10,129,760 B2
(45) Date of Patent: Nov. 13, 2018

(54) RESTORING CONNECTIVITY IN PARTITIONED WIRELESS SENSOR AND ACTOR NETWORKS

(71) Applicant: KING FAHD UNIVERSITY OF PETROLEUM AND MINERALS, Dhahran (SA)

(72) Inventor: Uthman Baroudi, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 79 days.

(21) Appl. No.: 15/276,301

(22) Filed: Sep. 26, 2016

(65) Prior Publication Data

US 2018/0091982 A1    Mar. 29, 2018

(51) Int. Cl.
*H04W 16/18* (2009.01)
*H04W 64/00* (2009.01)
(Continued)

(52) U.S. Cl.
CPC .......... *H04W 16/18* (2013.01); *H04W 4/023* (2013.01); *H04W 64/00* (2013.01);
(Continued)

(58) Field of Classification Search
CPC ... H04W 16/18; H04W 64/003; H04W 84/18; H04W 4/023; H04W 24/04; H04W 64/00; H04W 4/02
(Continued)

(56) References Cited

U.S. PATENT DOCUMENTS 6,282,170 B1 * 8/2001 Bentall ............... H04Q 3/0079
                                                370/225
7,773,558 B2 * 8/2010 Cho .................... H04W 16/10
                                                370/329

(Continued)

FOREIGN PATENT DOCUMENTS

WO    WO 2010/045971 A1    4/2010

OTHER PUBLICATIONS

G. Nicholls, "Location Inaccuracies in WSAN Placement Algorithms" http://repository.up.ac.za/bitstream/handle/2263/26682/dissertation.pdf?sequence=1, Feb. 2010, pp. 1-140.

(Continued)

Primary Examiner — Man U Phan
(74) Attorney, Agent, or Firm — Oblon, McClelland, Maier & Neustadt, L.L.P.

(57) ABSTRACT

Aspects of the disclosure provide a method for restoring connectivity among partitioned segments in a partitioned wireless sensor and actor network (WSAN). The method includes placing batches of mobile nodes at locations surrounding mobile nodes previously placed within a damaged area of the partitioned WSAN, spreading the batches of mobile nodes, determining whether connectivity among the partitioned segments has been restored, and repeating placing batches of mobile nodes, spreading the patches of mobile nodes, and determining whether connectivity among the partitioned segments has been restored when connectivity among the partitioned segments is not restored.

The method is based on a distributed dropping approach which introduces minimal disruption to previously deployed mobile nodes, and decreases total travelled distance a mobile node might move compared with a traditional central dropping approach. Thus, the distributed dropping approach (Continued)

can expedite the restoration process, reduce power consumption, and expand survival time of a WSAN.

10 Claims, 5 Drawing Sheets

(51) Int. Cl.
    *H04W 4/02*         (2018.01)
    *H04W 24/04*      (2009.01)
    *H04W 84/18*      (2009.01)

(52) U.S. Cl.
    CPC .......... *H04W 64/003* (2013.01); *H04W 24/04* (2013.01); *H04W 84/18* (2013.01)

(58) Field of Classification Search
    USPC ......................................................... 370/338
    See application file for complete search history.

(56) References Cited

U.S. PATENT DOCUMENTS

| | | | | |
|---|---|---|---|---|
| 8,416,949 B2* | 4/2013 | Asano | .................. | H04L 9/0866 380/277 |
| 8,614,956 B2* | 12/2013 | Baliga | .................. | H04W 16/18 370/243 |
| 8,861,331 B2* | 10/2014 | Abbasi | ................ | H04W 40/248 370/216 |
| 8,923,882 B2* | 12/2014 | Gandhi | ................. | H04W 16/20 370/274 |
| 8,982,795 B2* | 3/2015 | Kim | ....................... | H04W 84/18 370/328 |
| 9,146,820 B2* | 9/2015 | Alfadhly | ............. | G06F 11/2002 |
| 9,819,574 B2* | 11/2017 | Yang | ....................... | H04L 45/16 |

OTHER PUBLICATIONS

T.T. Truong, et al., "Multi-objective hierarchical algorithms for restoring Wireless Sensor Network connectivity in known environments" https://www.insight-centre.org/sites/default/files/publications/published-version.pdf, May 15, 2015, pp. 190-208.

M.Sir, et al., "An Optimization-based Approach for Connecting Partitioned Mobile Sensor/Actuator Networks" http://cse.uni.edu/~byrav/INFOCOM2011/workshops/papers/p525-sir.pdf, 2011, pp. 525-530.

M.Younis, et al., "Topology management techniques for tolerating node failures in wireless sensor networks: A survey" Computer Networks vol. 58, 2014, pp. 254-283.

I. Senturk, et al., "Relay placement for restoring connectivity in partitioned wireless sensor networks under limited information" Ad Hoc Networks, vol. 13, 2014, pp. 487-503.

\* cited by examiner

---

1: procedure DropRelays($T_r, N_s$)

2: $\alpha \leftarrow 1, \theta \leftarrow 2\pi/N_s$

3: *while* | partitions | > 1 *do*

4: //drop batch of relays in all $N_s$ sectors

3: *for* i = {0, 2,....., $N_s - 1$} *do*

4:     DropLocation: $(\alpha T_r, i\theta)$

5:     DeploySensors-FBA

6: *end for*

7:    $\alpha \leftarrow \alpha + 1$

8: *end while*

---

RESTORING CONNECTIVITY IN PARTITIONED WIRELESS SENSOR AND ACTOR NETWORKS

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless sensor and actor networks (WSANs) refer to a group of sensor nodes and actor nodes wirelessly linked to perform distributed sensing and acting tasks. In one example of WSANs, sensor nodes collect information from their surrounding environment and transmit sensor data to actor nodes, while the actor nodes collaboratively make decisions based on the collected information and take actions upon the environment. WSANs can be applied in various fields, such as space exploration, combat field reconnaissance, border protection, search and rescue, and the like.

Upon their deployment, nodes of WSANs are expected to stay connected with each other and form a network. Network connectivity enables nodes to coordinate their action while performing a task, and to forward their readings, for example, to a base-station that serves as a gateway to remote control centers. However, WSANs are prone to node failures. For example, a node may fail due to an external damage caused by, for example, natural disasters, or because of hardware malfunction, battery depletion or improper initial deployment. In some applications, WSANs operating in a harsh environment may suffer from large scale damage which partitions the network to disjoint segments. For example, in a battle field, parts of the deployment area may be bombed, and nodes in the vicinity would be destroyed and surviving nodes can be split into disjoint partitions (segments). Losing connectivity between partitioned segments prevents data exchange and coordination among some nodes. Therefore, restoring the overall network connectivity is crucial.

The existing solutions for restoring connectivity of partitioned WSANs can be categorized into two categories: self-healing approaches that exploit the existing actor nodes to restore the network connectivity, and relay-based approaches that use external actor nodes in order to restore connectivity.

The self-healing approaches reconnect the separated partitions by reducing the distance between surviving nodes below their transmission range, so it does not require extra node deployment. However, the self-healing approaches require mobility of some nodes, which may increases the cost and adds an extra complexity to the hardware, in addition to high energy consumption for long distance travelling. The self-healing approaches can be subcategorized into centralized approaches and distributed approaches. In centralized approaches, the information about remaining undamaged nodes can be collected possibly by a server which performs the selection of the nodes to move and their final destination, to assure connectivity. The distributed approach does not require complete information about the damage and the partitions.

The relay-based approaches restore connectivity among segments by deployment of additional relay nodes (mobile nodes). Some solutions based on the relay-based approaches may require information about the damaged area, the number of network partitions and the location of the remaining nodes. However, that information may be inaccurate or may not be obtained for some applications where access to the damaged area is impractical due to difficult or dangerous scenarios, such as gas leakage, forest fire, or geographical difficulties (e.g., Amazon forest or active volcanoes). Thus, the relay nodes self-deployment strategies are needed for applications where accurate information of partitioned WSANs is not available.

SUMMARY

Aspects of the disclosure provide a method for restoring connectivity among partitioned segments in a partitioned wireless sensor and actor network (WSAN). The method includes placing batches of mobile nodes at locations surrounding mobile nodes previously placed within a damaged area of the partitioned WSAN, spreading the batches of mobile nodes, determining whether connectivity among the partitioned segments has been restored, and repeating placing batches of mobile nodes, spreading the patches of mobile nodes, and determining whether connectivity among the partitioned segments has been restored when connectivity among the partitioned segments is not restored.

The method is based on a distributed dropping approach which introduces minimal disruption to previously deployed mobile nodes, and decreases total travelled distance a mobile node might move compared with a traditional central dropping approach. As a result, the distributed dropping approach can expedite the restoration process, reduce power consumption, and expand survival time of a WSAN.

In an example, the locations surrounding previously placed mobile nodes are within a transmission range of the previously placed mobile nodes.

An embodiment of the method further includes placing batches of mobile nodes at locations surrounding previously placed mobile nodes but excluding locations where a partitioned segment is connected to the mobile nodes previously placed within the damaged area of the partitioned WSAN.

In one example, the method further includes placing an initial batch of mobile nodes at an initial location within a damaged area of the WSAN. In another example, the method further includes placing first batches of mobile nodes at locations on a first circle centered at the initial location with a first radius, and placing second batches of mobile nodes at locations on a second circle centered at the initial location with a second radius that is larger than the first radius. In a further example, the method further includes placing a first batch of mobile nodes at a first location surrounding the mobile nodes previously placed within the damaged area of the partitioned WSAN, spreading the first batch of mobile nodes, and placing a second batch of mobile nodes at a second location surrounding the mobile nodes previously placed within the damaged area of the partitioned WSAN. In an even further example, the method further includes spreading the batches of mobile nodes according to a force based algorithm (FBA).

Aspects of the disclosure provide a method for placing mobile nodes to restore connectivity among partitioned segments in a partitioned WSAN. The method includes placing an initial batch of mobile nodes at an initial location within a damaged area of the partitioned WSAN, placing batches of mobile nodes at locations surrounding previously placed mobile nodes that are previously placed within a damaged area of the partitioned WSAN, and repeating placing batches of mobile nodes at locations surrounding previously placed mobile nodes until connectivity among partitioned segments is restored.

Aspects of the disclosure provide a method for spreading mobile nodes dropped for restoring connectivity among partitioned segments in a partitioned WSAN. The method includes receiving, at a mobile node, location information from neighboring nodes, calculating a net repulsive force that is imposed on the mobile node and includes a sum of repulsive forces from the neighboring nodes within a threshold distance from the mobile node, calculating a net movement distance based on the net repulsive force imposed on the mobile node determining a location based on the net movement distance when the net movement distance is smaller than the transmission range, or based on a restricted movement distance restricted to a transmission range of the neighboring nodes when the net movement distance is larger than the transmission range, and moving the mobile node to a location determined based on the calculated restricted movement distance.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

I. Example of Partitioned Wireless Sensor and Actor Networks (WSANs)

Figure 1:
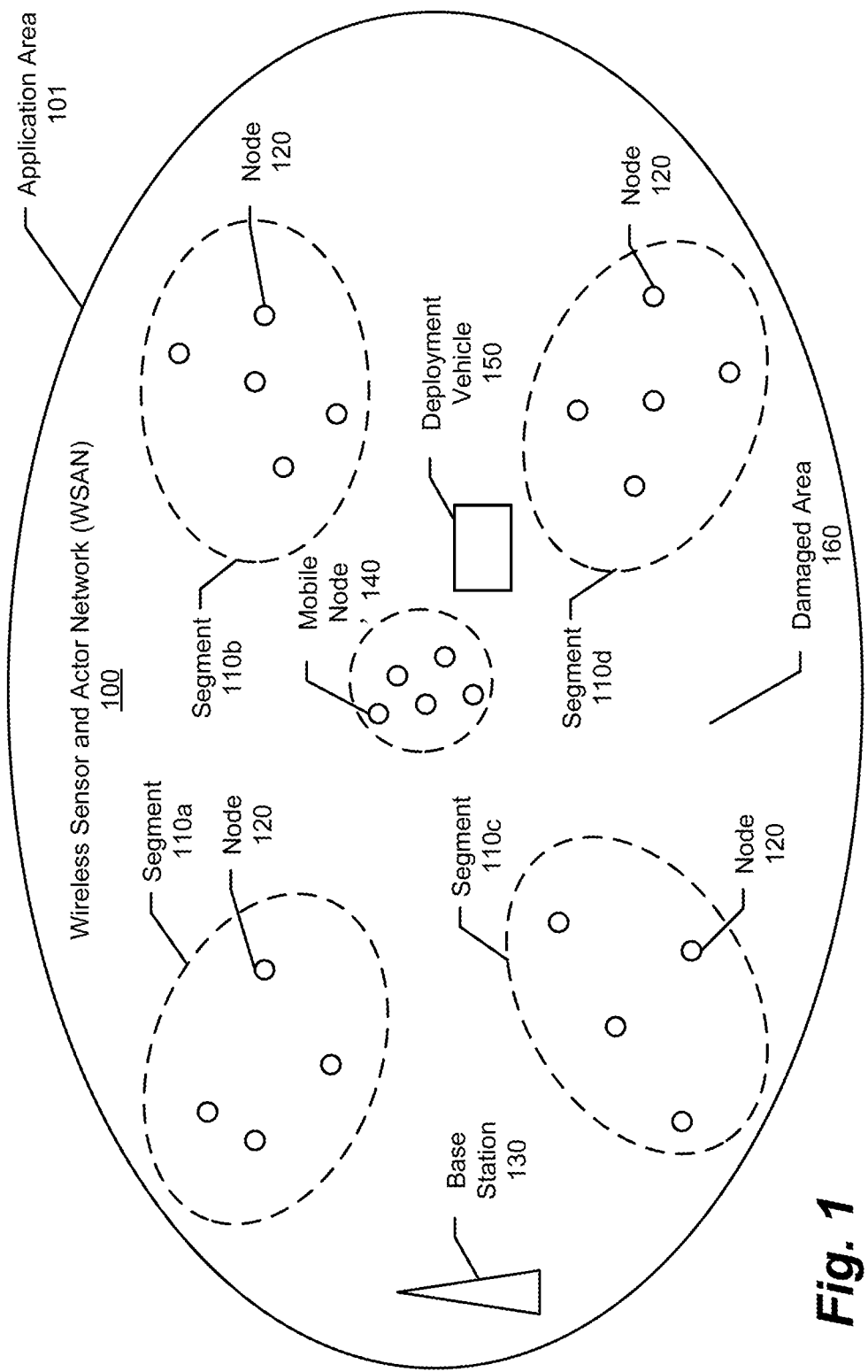
FIG. 1 shows an example of a partitioned wireless sensor and actor network (WSAN)

FIG. 1 shows an example of a partitioned WSAN 100. The WSAN 100 initially includes a plurality of sensor nodes and actor nodes that are randomly deployed into an application area 101. However, due to node failures, for example, caused by a natural disaster, the WSAN 100 is partitioned into four isolated segments 110a-110d. Nodes in damaged area 160 stop to operate, while nodes 120 within each segment 110a-110d can operate properly and communicate with each other directly or via other nodes of the same segment, thus forming portioned sub-networks. In addition, nodes 120 within each segment 110a-110d can include nodes unable to move (e.g., a sensor without moving ability) and nodes able to move (e.g., a robotic actor with moving ability), but nodes 120 within each segment 110a-110d remain stationary after being partitioned. The WSAN 100 can also include a base station 130 which serves as a gateway providing a communication channel between the WSAN 100 and a control center (not shown). Through the based station 130, sensor data can be transmitted to the control center for further processing, and control command can be transmitted to nodes of the WSAN 100.

After the partition of the WSAN 100 is detected, for example, by the base station 130, a restoration process can be initiated. As shown in FIG. 1 example, a deployment vehicle 150 can be employed to deploy additional mobile nodes 140 to the damaged area 160. The deployment vehicle 150 can be a robot, an unmanned aerial vehicle (UAV), and the like. The mobile nodes 140 can include positioning circuitry to determine its location, and wireless communication circuitry to exchange location information among the mobile nodes 140.

During the restoration process, multiple batches of mobile nodes 140 can be sequentially placed to certain different locations. One way for mobile node placement (referred to as central dropping approach) is to drop batches of mobile nodes 140 at a same location near the center of the damaged area 160, and the dropped mobile nodes then spread to locations close to the partitioned segments 110a-110d in order to reach the segments 110a-110d.

According to an aspect of the disclosure, in some examples, a distributed dropping approach for mobile node placement is adopted instead of dropping mobile nodes at a central location within the damaged area. Specifically, in an example of the distributed mobile node placement approach, a first batch of mobile nodes can be placed at a central location of the damaged area 160, and subsequent batches of mobile nodes can be placed around the previously deployed mobile nodes, for example, on a circle surrounding the previously deployed mobile nodes and in different directions from the central location. The distributed dropping approach introduces minimal disruption to previously deployed mobile nodes, and decreases total travelled distance a mobile node might move compared with the central dropping approach. As a result, the distributed dropping approach can expedite the restoration process, reduce power consumption, and expand survival time of a WSAN.

II. Force Based Algorithm (FBA) for Spreading Deployed Mobile Nodes

In some examples, batches of deployed mobile nodes 140 spread over the damaged area 160 in order to reconnect the disjoint segments 110a-110d of the partitioned WSAN 100, and the spreading process utilizes a force based algorithm (FBA). In the FBA, each mobile node 140 is assumed to be polarized with a same magnetic pole, and impose virtual repulsive forces upon each other based on the principle of magnetic repelling forces in physics. For example, initially, some batches of mobile nodes 140 have been deployed and spread over the damaged area 160. Then, one or more batches of mobile nodes 140 are placed at certain locations near previously deployed mobile nodes 140. The newly deployed mobile nodes 140 of the same batch are close to each other. In addition, the newly deployed mobile nodes 140 are also close to the previously dropped mobile nodes 140. As a result, the mobile nodes 140, newly or previously deployed, apply repulsive forces to each other.

Figure 2:
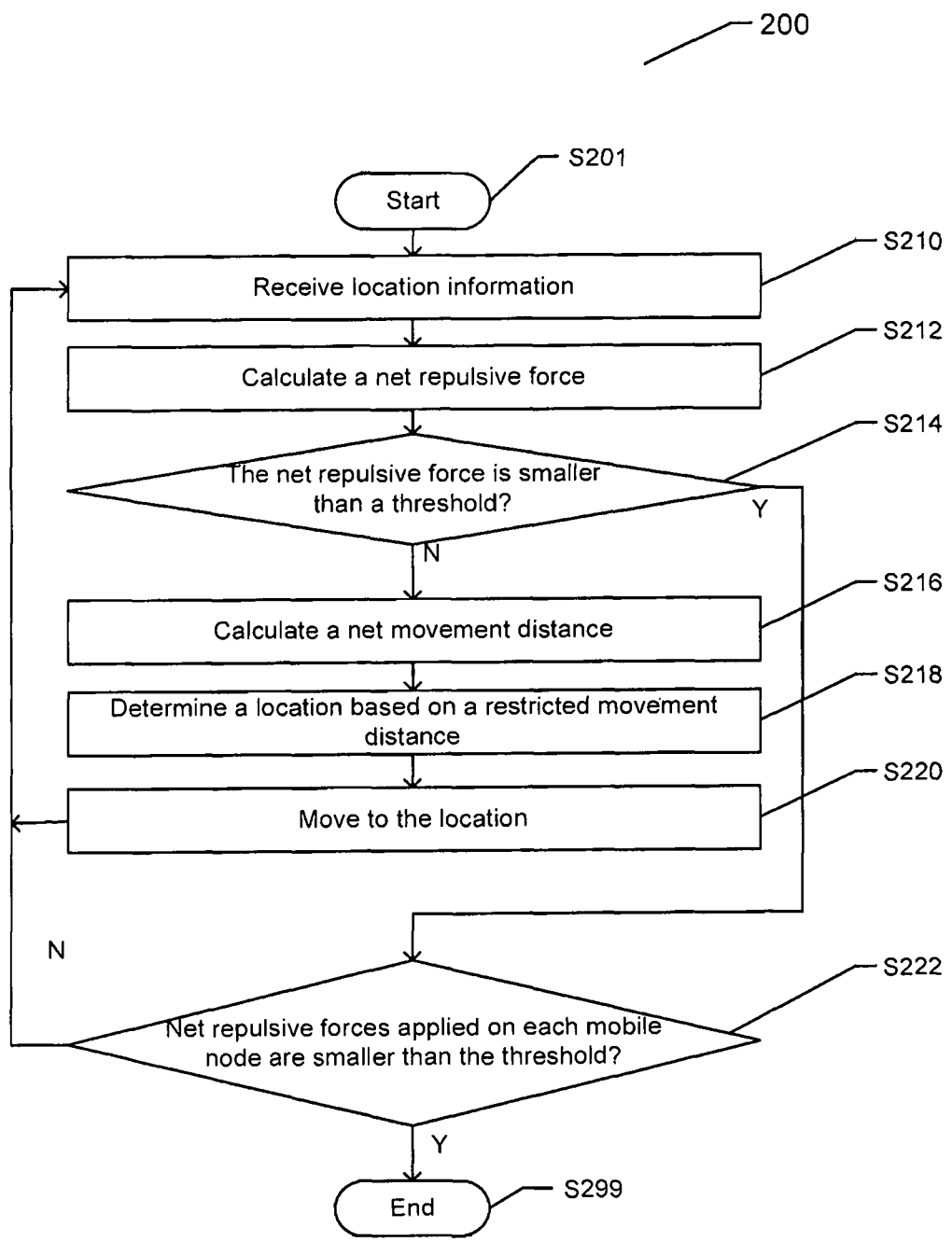
FIG. 2 shows an exemplary flowchart of a process for spreading the deployed mobile nodes based on a force based approach.

FIG. 2 shows a flowchart of a process 200 for spreading the deployed mobile nodes 140 based on the FBA. The process 200 can be performed by a mobile node 140 dropped at the damaged area 160 in the FIG. 1 example. The process 200 starts at S201 and proceeds to S210.

At S210, location information is received from neighboring nodes at a mobile node Ni. In one example, some batches of mobile nodes 140 are newly deployed, and a spreading process is initiated to move the mobile nodes 140 to locations close to the disjoint segments 110a-110d. In another example, after batches of mobile nodes 140 are newly deployed, a spreading process has been performed for several iterations, and new movement locations need to be determined for a new iteration. In order to determine the movement locations, location information of neighboring nodes needs to be exchanged among the deployed mobile nodes 140. The neighboring nodes can include deployed mobile nodes 140 and the stationary nodes 120 in the segments 110a-110d.

In an example, each node of the WSAN (mobile nodes 140 or stationary nodes 120) can include positioning circuitry, such as a GPS receiver, that generates location information of the respective mobile node. In addition, each node 140/120 can include wireless communication circuitry enabling message exchanges among the nodes 140/120. Thus, a node 140/120 can receive a message from its neighboring nodes 140/120 carrying location information of each respective neighboring node 140/120.

In addition, message exchanged between two nodes 140/120 may be unsuccessful due to the effect of wireless channel corruption between the nodes 140/120 (e.g., fading or shadowing experienced from surrounding environment). In some examples, when one node 140/120 cannot receive messages from a neighboring node, the node 140/120 will ignore the existence of this neighboring node without considering a virtual repulsive force from this neighboring node.

At S212, a net repulsive force Fi is calculated at the mobile node Ni based on location information received from neighboring nodes 140/120. In one example, the net repulsive force Fi equals a sum of virtual repulsive forces applied by each neighboring node that is within a threshold distance from the mobile node Ni and whose messages can be received at the mobile node Ni, and the virtual repulsive forces by each neighboring node are added by vector operations as in physics. Accordingly, the net repulsive force Fi applied on the mobile node Ni can be represented as follows, $$Fi = \Sigma_{j=1, j\neq i}^{M} Fij \qquad (1)$$

where Fij represents a repulsive force applied on the mobile node Ni by a neighboring node Nj. The force Fij depends on a distance dij between the two nodes Ni and Nj, and an orientation angle of Nj with respect to Ni, and can be described by a polar coordinate notation (r, θ), where r is the magnitude and θ is the orientation angel. Specifically, the force Fij can be calculated using the following expression, $$Fij = \begin{cases} 0, & \text{if } dij \geq Tr \\ \left(\frac{Wr}{Tr}(Tr-dij), \pi + a_{ij}\right), & \text{if } dij < Tr \end{cases} \qquad (2)$$

where Tr is the transmission range of the mobile nodes 140 in the damaged area 160 that is used as a distance threshold to control how close the two nodes Ni and Nj can be from each other, $a_{ij}$ is the line segment orientation angel from Ni to Nj, and $w_r$ is a repulsive force factor. Accordingly, the repulsive force Fij is inversely proportional to the distance dij between the two nodes Ni and Nj. When the distance dij is greater than the threshold distance, the repulsive force Fij equals zero, and no virtual repulsive force between the two nodes Ni and Nj is considered.

As the deployed mobile nodes spread towards the disjoint segments 110a-110d, a disjoint segment 110a-110d may become within the transmission range of the deployed mobile nodes 140 and thus connected to the deployed mobile nodes 140. Once a segment 110a-110d is connected to the deployed mobile nodes 140, in order to stop expansion of the deployed mobile nodes 140 towards the connected segment 110a-110d, the stationary nodes 120 at the edge of the connected segment 110a-110d may exert repulsive forces towards the deployed mobile nodes 140 within its transmission range. Thus, in some examples, when calculating the net repulsive force Fi for the node Ni using the expression (1) and (2), the stationary nodes 120 at the edge of connected segment 110a-110d are also considered.

In a further example, a repulsive force $F_R$ from a boundary of the application area 101 is added to the net repulsive force Fi when a deployed mobile node 140 reaches the boundary, thus limiting the expansion of the deployed mobile nodes 140 within the application area. Accordingly, the net repulsive force Fi can be calculated using the following expression, $$Fi = F_R + \Sigma_{j=1, j\neq i}^{M} Fij \qquad (3)$$

The repulsive force $F_R$ can be calculated as in expression (2) where a distance between the node Ni and the boundary is used in place of dij, and an orientation angel of the line segment from Ni towards the boundary (the line segment is perpendicular to the boundary) is used in place of $a_{ij}$.

At S214, whether the net repulsive force Fi applied on the mobile node Ni is smaller than a threshold is determined. When the net repulsive force Fi is smaller than the threshold, the process 200 proceeds to S222; otherwise, proceeds to S216.

At S216, a net movement distance is calculated based on the net repulsive force Fi for the mobile node Ni. In one example, the net repulsive force Fi calculated with expression (2) or (3) is used as the net movement distance.

At S218, a location for the mobile node Ni to move to is determined based on a restricted movement distance. For example, when nodes are very close to each other, the net repulsive force between them could be very large, so the net move distance to move would be greater than the transmission range Tr. Thus, in one example, the maximum movement distance for each mobile node 140 is restricted to a restricted movement distance equal to the transmission range Tr. Specifically, the location ($x_L$, $y_L$) for the mobile node Ni to move from its current location ($x_i$, $y_i$) is determined using the following expressions, $$x_L = \begin{cases} x_i + \overline{X_L}, & \overline{X_L} < Trx \\ x_i + Trx, & \overline{X_L} > Trx \end{cases} \qquad (4)$$

$$y_L = \begin{cases} y_i + \overline{Y_L}, & \overline{Y_L} < Try \\ y_i + Try, & \overline{Y_L} > Try \end{cases} \qquad (5)$$

where $\overline{X_L}$ is the net distance to move in the direction of x-axis, $\overline{Y_L}$ is the net distance to move in the direction of y-axis, Trx=Tr cos(θ), Try=Tr sin(θ), and θ is the net repulsive force orientation angle.

At S220, the mobile node Ni moves to the location determined at S218. Meanwhile, other mobile nodes 140 in the damaged area 160 also move to locations determined in a process similar as the steps of S210-S220 for the mobile node Ni. When movement of each mobile node 140 in the damaged area 160 takes place, the balance of impulsive forces changes accordingly among the mobile nodes 140. Then, a new iteration of the steps for calculating a net repulsive force and determining a new location needs to be performed at the mobile node Ni. Accordingly, the process 200 returns to S210, and repeats.

At S222, whether net repulsive forces applied on each mobile node 140 are smaller than the threshold is determined. For example, at each mobile node 140, the step similar to S212 is performed, and a net repulsive force applied to each mobile node 140 can be calculated. The information of the calculated net repulsive forces can be transmitted to a control center, for example, through communications between the mobile nodes 140 and the base station 130 or between the mobile nodes 140 and the deployment vehicle 150. The control center can determine whether net repulsive forces applied on each mobile node 140 are smaller than the threshold.

When the net repulsive forces applied on each mobile node 140 are smaller than the threshold, it means that the mobile nodes 140 have entered into a stable status and the spreading process 200 can be stopped. Accordingly, the process 200 proceeds to S299 and terminates at S299. On the other hand, when one of the net repulsive forces applied on each mobile node 140 is larger than the threshold, the process 200 continues at the mobile node Ni. Accordingly, the process 200 returns to S210 and is performed again. The result of the determination made at the control center can be transmitted to the mobile node Ni and other mobile nodes 140, such that the mobile nodes 140 can subsequently take actions to continue the process 200 or terminate it.

III. Distributed Dropping Approach for Mobile Nodes Placement

As shown in the FIG. 1 example, after partition of the WSAN 100 is detected, a deployment vehicle is employed to drop additional mobile nodes 140 in the damaged area 160 to restore the connection of the disjoint segments 110a-110d. The mobile nodes 140 spread over the damaged area 160 based on the FBA as described above after being deployed, and eventually become uniformly distributed.

In the central dropping approach, multiple batches of mobile nodes are periodically dropped in a central location within the damaged area 160, which disrupt the already-settled previously dropped mobile nodes. For example, newly deployed mobile nodes near the central location will push previously deployed mobile nodes to move away from the central location. Consequently, total travelled distance of each deployed mobile node 140 will increase continually until disjoint segments are reconnected leading to continually increased power consumption of each mobile node 140.

In one example, the distributed dropping approach is employed for mobile node placement. In the distributed dropping approach, newly deployed batches of mobile nodes are placed at locations away from the center of the damaged area 160, for example, to locations surrounding the previously deployed mobile nodes 140. In this way, the restoration process can be expedited and total travel distance and power consumption of each mobile node 140 can be decreased compared with the central dropping approach.

Figure 3:
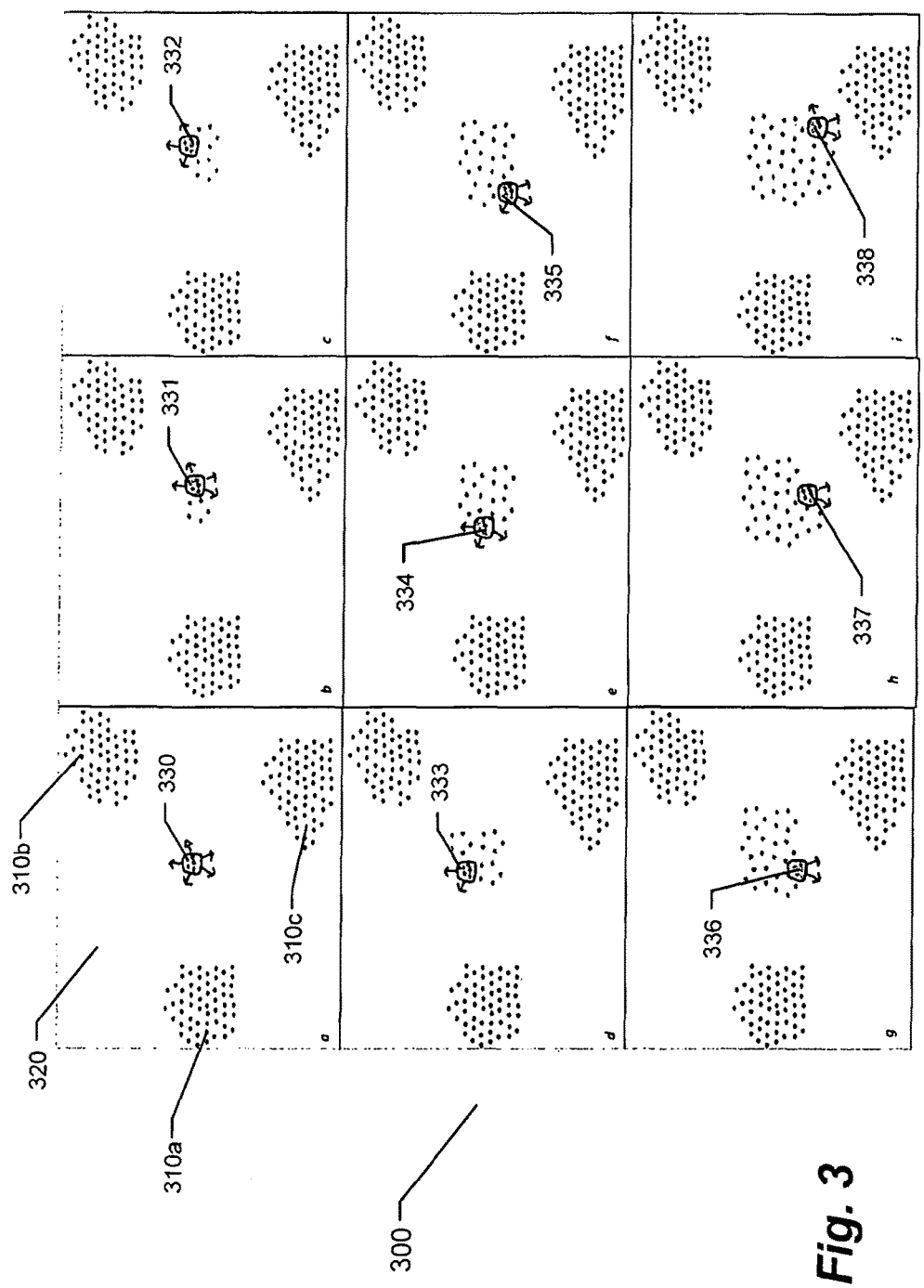
FIG. 3 shows an example of a mobile node placement process utilizing the distributed dropping algorithm.

FIG. 3 shows an example of a mobile node placement process 300 utilizing the distributed dropping approach. The process 300 includes nine steps (a) to (i) corresponding to the nine figures labeled with letters a to i, respectively, in FIG. 3. Accordingly, the nine figures are referenced as FIG. 3a to FIG. 3i, respectively. As shown in each of the figures from FIG. 3a to FIG. 3b, a WSAN is partitioned into three disjoint segments 310a-310c, and multiple batches of mobile nodes 330-338 are placed at certain locations in a damaged area 320 during the process 300, for example, by a UAV. In one example, in each step (a) to (i), the deployed mobile nodes spread over the damaged area 320 based on the above FBA and enter a balanced status.

At step (a), a first batch of mobile nodes 330 is placed at a first location (an initial location), for example, a central location or the center of the damaged area 320. Generally, the first location is selected to be a location leading to the most sufficient mobile node placement solution according to some evaluation metrics, for example, total mobile node traveled distance, number of deployed mobile nodes, and the like. In some examples, a central location or the center of a damaged area is selected to be the first location for mobile node placement. For example, in some situations, the locations of partitioned segments and nodes within the partitioned segments are known after a WSAN is damaged. For such situations, the central location or center of the damaged area can be a location that has a minimum sum of distances to borders of the partitioned segments. In other situations, the locations of partitioned segments and nodes within the partitioned segments are unknown after a WSAN is damaged, however, the border of the application area is known. For such situations, the central location or center of the damaged area can be a location which is the centroid or geometric center of the damaged area. In one example, a central location is known to all partitioned segments beforehand. In another example, the survived partitions can estimate a central location based on priori communications among partitioned segments before the WSAN is partitioned.

After the deployment at the first location, batches of mobile nodes are sequentially deployed at locations surrounding the deployed mobile nodes. The locations surrounding the deployed mobile nodes are selected based on the distributed dropping approach, such that disruptions to the previously deployed mobile nodes are minimized. In FIG. 3 example, locations are determined to be on a circle with a radius of $\alpha \cdot Tr$ centered on the initial location. Specifically, at step (b), a second batch of mobile nodes 331 is placed at a second location that is to the east of the first location with a preconfigured distance denoted as $\alpha \cdot Tr$ ($\alpha=1$) where Tr is the transmission range of the deployed mobile nodes. At step (c), a third batch of mobile nodes 332 is placed at a third location that is to the northeast of the first location with the same distance $\alpha \cdot Tr$ ($\alpha=1$). At step (d), a fourth batch of mobile nodes 333 is placed at a fourth location that is to the north of the first location with the same distance $\alpha \cdot Tr$ ($\alpha=1$). Similarly, from step (e) to step (i), a sequence of batches of mobile nodes 334-338 are sequentially placed at different locations surrounding the first location. Specifically, the different locations are locations to the northwest, west, southwest, south, south east of the first location corresponding to the figures FIG. 3(e) to FIG. 3(i). In addition, the different locations are on a circle centered at the first location and having a radius equal to $\alpha \cdot Tr$ ($\alpha=1$).

After the steps (a) to (i) as illustrated in FIG. 3, the process 300 may continue in the following way if disconnected segments still exist. For example, additional batches of mobile nodes can be placed at locations located on a circle centered at the first location however with a radius equal to $\alpha \cdot Tr$ ($\alpha=2$). In addition, the locations on the circle can be in various directions from the first location. This process 300 may further continues with a increasing gradually, for example, from 2 to 3, 4, . . . , and batches of mobile nodes are continually deployed around previously deployed mobile nodes.

During the above deployment process, the spreading mobile nodes may reach a disjoint segment in a certain direction from the first location (for example, the mobile nodes are within a transmission range of a stationary node within the disjoint segment). When this event occurs, the deployment of additional batches of mobile nodes at this direction will be skipped. In other words, the mobile nodes will not be placed at locations where a partitioned segment is connected to the deployed mobile nodes.

It is noted that the above example is only for illustration purpose. The distance between the central location and the locations for placing batches of mobile nodes can be varied with various manners. For example, another distance configuration can be utilized other than the transmission range Tr, and the factor α may change with other different increment values. In addition, locations for mobile node placement on a circle with the preconfigured distance may be determined in other ways instead of eight directions evenly distributed on the circle.

III. Connectivity Restoration Approach in a Partitioned WSAN

In some examples, a connectivity restoration approach is employed to reconnect disjointed segments 110a-110d in the WSAN 100. The connectivity restoration approach is based on the above described FBA and distributed dropping approach. Two examples illustrating the connectivity restoration approach are described below. The first example is described with reference to FIGS. 4 and 5, and the second example is described with reference to FIG. 6.

Figures 4, 5:
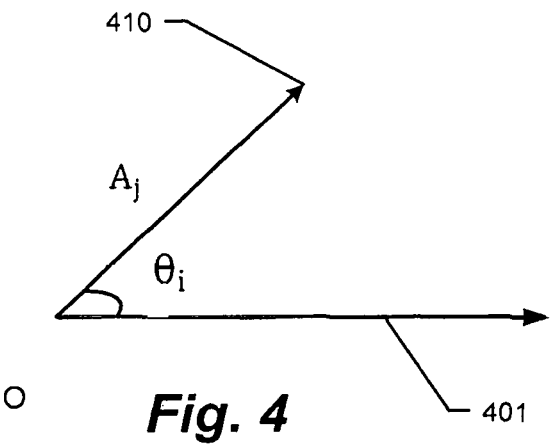
FIG. 4 shows a polar representation of a process of dropping batches of mobile nodes.
FIG. 5 shows an example of an algorithm (in the form of pseudocode) for restoring disjoint segments in the WSAN.

FIG. 4 shows a polar representation of a process of dropping batches of mobile nodes 140. In FIG. 4, the point O is the reference point (the pole of the polar coordinate system) representing an initial deployment position (e.g., the center of the damaged area 160 in FIG. 1 example), and the ray 401 is the reference direction (the polar axis). The point 410 represents a position where a batch of mobile nodes is placed. Accordingly, the dropping process can be mathematically presented with the following expressions, $$S_j = A_j \angle \theta_i \quad (6)$$

$$A_j = \alpha \cdot Tr, \alpha = 1, 2, \ldots \quad (7)$$

$$\theta_i = i\theta, i = 1, 2, \ldots, N_s \quad (8)$$

In the above expressions, $S_j$ represents the position 410 in the form of polar coordinates, and $A_j$ represents the distance between the reference point O and the position 410. The distance $A_j$ is limited by a distance between the initial deployment location O and a nearest partition in a specific orientation. In addition, as represented by the expression (7), the distance $A_j$ is expanded as the factor α varies during a dropping process. Further, as represented by the expression (8), the orientation angle $\theta_i$ varies during a dropping process, and for each round of dropping with an unchanged $A_j$ value, the damaged area is divided into a number ($N_s$) of equal sectors.

FIG. 5 shows an example of an algorithm 500 (in the form of pseudocode) for restoring disjoint segments 110a-110d in the WSAN 100. The polar representation described with reference to FIG. 4 is used in the algorithm.

At the beginning of the algorithm 500 as described in line 2, the factor α is set to be 1, and the orientation angle θ is set to 2π/Ns. As described by lines 3 and 8, the deployment of batches of mobile nodes will continue until all disjointed segments are connected. Lines 3-7 describe the process of deployment of the batches of mobile nodes. Specifically, corresponding to a certain value of the factor α, the deployment is performed on locations at a circle with a radius of α·Tr, and the locations are in $N_s$ different directions from the initial deployment point O, as described by lines 3 and 4.

After each placement of a batch of mobile nodes, all deployed mobile nodes perform the FBA to spread over the damaged area 160 as described by line 5. After the deployment on a circle with a certain value of the factor α, the distance $A_j$ is expanded as described by line 7.

Figure 6:
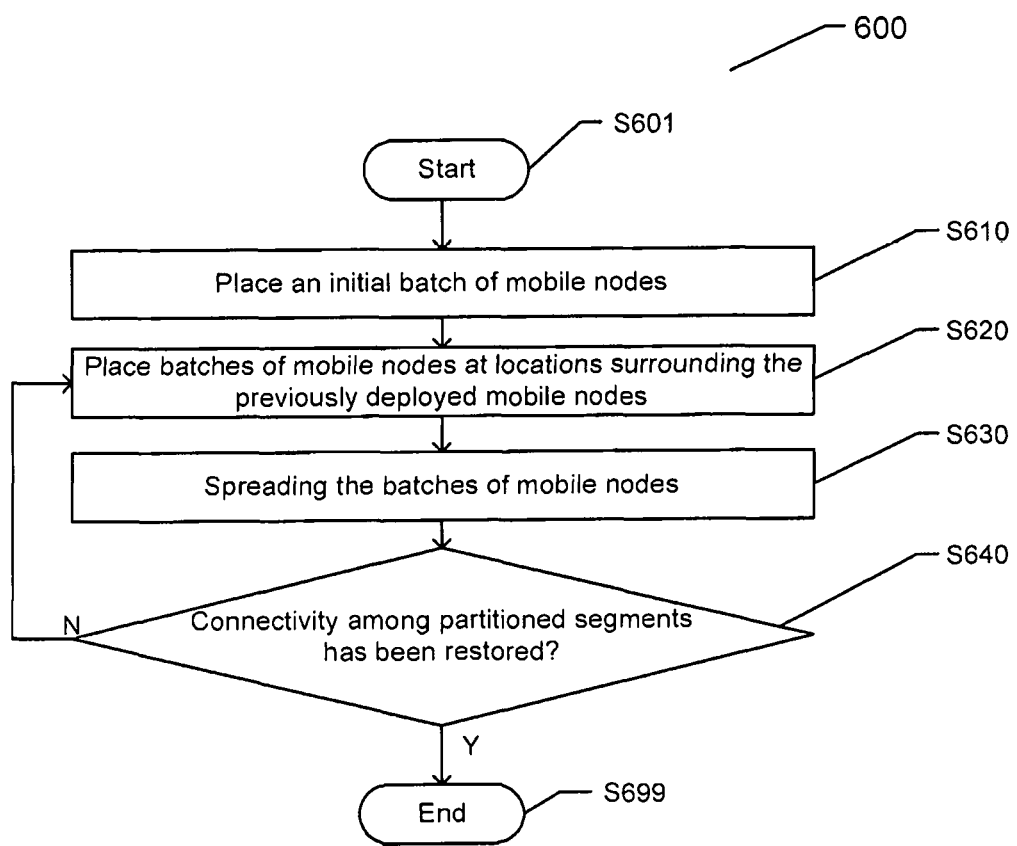
FIG. 6 shows an example of a process for restoring connectivity in a partitioned WSAN.

FIG. 6 shows an example of a process 600 for restoring connectivity in a partitioned WSAN. FIG. 1 example is used for explanation of the process 600. The process 600 starts at S601 and proceeds to S610.

At S610, an initial batch of mobile nodes is placed at a central location of the damaged area 160 of the FIG. 1 example. For example, after a natural disaster event takes place, partition of the WSAN 100 is detected, and the process 600 can be initiated. A deployment vehicle (e.g., a UAV) can be employed to place the first batch of mobile nodes at the center of the damaged area 160. After the deployment, the first batch of mobile nodes can spread based on the FBA and enter a stable status.

At S620, subsequent batches of mobile nodes can be sequentially placed at locations surrounding the previously deployed mobile nodes. The deployment can be based on the distributed dropping approach described above, and performed by the deployment vehicle 150 (e.g., a robot, a UAV, and the like). In one example, as described herein, the batches of mobile nodes can be placed at locations on a circle centered at the initial deployment location with a radius of a certain configured value (e.g., multiples of the transmission range of the mobile nodes). The locations for deployment can be in different directions from the initial deployment location. In addition, at locations where a disjoint segment is reconnected to the deployed mobile nodes, deployment of new mobile nodes will not be performed. In such a distributed dropping approach, the disruption by the newly deployed mobile nodes on the previously deployed mobile nodes can be decreased compared to the central dropping approach in which mobile nodes are deployed on the initial deployment location.

At S630, the batches of mobile nodes deployed at S620 are spread over the damaged area 160 based on the FBA. For example, each deployed mobile node can perform a spreading process based on the FBA until all deployed mobile nodes enter a balanced status. During the spreading process, a disjoint segment may be connected to the deployed mobile nodes, information of which can be transferred to a control center, for example, through a base station.

In another example, information of reconnection of a disjoint segment is transmitted to the deployment vehicle 150, such that the deployment vehicle 150 knows about locations where a segment is connected to the deployed mobile nodes, and a next round of mobile node placement will be skipped at the respective locations.

At S640, whether connectivity among the partitioned segments has been restored is determined, for example, by the control center, based on the reconnection information received from the base station 130. When there are still disconnected segments to be connected, the process 600 returns to S620. In one example, the control center transmits a message to the deployment vehicle 150 to inform the result of the determination, such that a next round of deployment can be performed. In another example, a deployment vehicle can be used to perform the step of S640 to make the determination instead of the control center. When it is determined that all segments have been reconnected, the process proceeds to S640, and terminates at S640.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for restoring connectivity among partitioned segments disjoint with each other in a wireless sensor and actor network (WSAN), comprising:
placing an initial batch of mobile nodes at an initial location within a damaged area of the WSAN, and spreading the initial batch of mobile nodes;
placing first batches of mobile nodes at first locations on a first circle centered at the initial location with a first radius, and spreading the first batches of mobile nodes;
placing a second batch of mobile nodes at a second location on a second circle centered at the initial location with a second radius that is larger than the first radius, and spreading the second batch of mobile nodes;
determining whether connectivity among the partitioned segments has been restored; and
when connectivity among the partitioned segments is not restored, placing additional batches of mobile nodes surrounding previously placed mobile nodes.

2. The method of claim 1, wherein the second location on the second circle is within a transmission range of the previously placed first batches of mobile nodes.

3. The method of claim 1, further comprising:
placing batches of mobile nodes at locations surrounding previously placed mobile nodes excluding locations where one of the partitioned segments is connected to the previously placed mobile nodes within the damaged area of the partitioned WSAN.

4. The method of claim 1, further comprising:
placing a third batch of mobile nodes at a third location surrounding the previously placed mobile nodes placed within the damaged area of the partitioned WSAN;
spreading the third batch of mobile nodes; and
placing a fourth batch of mobile nodes at a fourth location surrounding the previously placed mobile nodes placed within the damaged area of the partitioned WSAN.

5. The method of claim 1, further comprising:
spreading each batch of mobile nodes according to a force based algorithm (FBA).

6. A method for placing mobile nodes to restore connectivity among partitioned segments disjoint with each other in a wireless sensor and actor network (WSAN), comprising:
placing, by a deployment vehicle, an initial batch of mobile nodes at an initial location within a damaged area of the partitioned WSAN;
placing, by the deployment vehicle, first batches of mobile nodes at locations on a first circle centered at the initial location with a first radius;
placing, by the deployment vehicle, a second batch of mobile nodes at a second location on a second circle centered at the initial location with a second radius that is larger than the first radius; and
repeating placing batches of mobile nodes at locations surrounding previously placed mobile nodes until connectivity among partitioned segments is restored.

7. The method of claim 6, wherein the second location on the second circle is within a transmission range of the previously placed first batches of mobile nodes.

8. The method of claim 6, further comprising:
placing batches of mobile nodes at locations surrounding previously placed mobile nodes excluding locations where one of the partitioned segments is connected to the mobile nodes previously placed within the damaged area of the partitioned WSAN.

9. The method of claim 6, wherein the initial location is a central location of the damaged area of the partitioned WSAN.

10. The method of claim 6, further comprising:
placing a third batch of mobile nodes at a third location surrounding the mobile nodes previously placed within the damaged area of the partitioned WSAN; and
placing, after the third batch of mobile nodes is spread, a fourth batch of mobile nodes at a fourth location surrounding the mobile nodes previously placed within the damaged area of the partitioned WSAN.

* * * * *